(12) United States Patent
Rai et al.

(10) Patent No.: US 9,253,334 B1
(45) Date of Patent: Feb. 2, 2016

(54) METHOD AND SYSTEM FOR BALANCING SOFT HANDOFF GAIN AND RESOURCE USAGE

(75) Inventors: Deveshkumar Rai, Overland Park, KS (US); Manoj Shetty, Overland Park, KS (US); Sachin R. Vargantwar, Overland Park, KS (US); Siddharth S. Oroskar, Overland Park, KS (US); Ashvini Ganesh Canjeevaram, Burlington, MA (US)

(73) Assignee: Sprint Spectrum L.P., Overland Park, KS (US)

( * ) Notice: Subject to any disclaimer, the term of this patent is extended or adjusted under 35 U.S.C. 154(b) by 2581 days.

(21) Appl. No.: 11/927,208

(22) Filed: Oct. 29, 2007

(51) Int. Cl.
*H04W 72/00* (2009.01)
*H04M 15/00* (2006.01)
*H04W 36/30* (2009.01)
*H04M 3/22* (2006.01)

(52) U.S. Cl.
CPC ........ *H04M 15/8016* (2013.01); *H04M 3/2227* (2013.01); *H04W 36/30* (2013.01)

(58) Field of Classification Search
CPC ............ H04M 3/2227; H04M 7/1275; H04M 15/8016; H04M 15/8038; H04W 28/0231; H04W 28/0236; H04W 36/30
USPC .................................. 455/450, 442, 453, 452
See application file for complete search history.

(56) References Cited

U.S. PATENT DOCUMENTS

| | | | |
|---|---|---|---|
| 5,781,861 A * | 7/1998 | Kang et al. ..................... 455/442 |
| 6,049,716 A * | 4/2000 | Jung ............................... 455/442 |
| 6,078,817 A * | 6/2000 | Rahman ...................... 455/452.1 |
| 6,154,653 A * | 11/2000 | Jung .............................. 455/442 |
| 6,160,999 A * | 12/2000 | Chheda et al. .................. 455/69 |
| 6,198,910 B1 * | 3/2001 | Hanley .................. H04W 28/16 |
| | | | 455/436 |
| 6,381,458 B1 * | 4/2002 | Frodigh et al. ................ 455/442 |
| 6,556,553 B1 * | 4/2003 | Palmer .................. H04W 36/24 |
| | | | 370/331 |
| 6,714,788 B2 * | 3/2004 | Voyer ............................ 455/453 |
| 7,092,722 B1 * | 8/2006 | Oh et al. ..................... 455/456.1 |
| 7,113,786 B2 * | 9/2006 | Proctor, Jr. .................... 455/442 |
| 7,248,875 B2 * | 7/2007 | Schreuder et al. ............ 455/442 |
| 2001/0012778 A1 * | 8/2001 | Eriksson ............... H04W 28/08 |
| | | | 455/436 |
| 2002/0086679 A1 * | 7/2002 | Li ......................... H04W 16/06 |
| | | | 455/453 |
| 2003/0190892 A1 * | 10/2003 | Shimada ............. H04W 72/082 |
| | | | 455/63.1 |
| 2005/0047365 A1 * | 3/2005 | Hong .................... H04W 28/02 |
| | | | 370/328 |

FOREIGN PATENT DOCUMENTS

EP            1377101 A1    1/2004

* cited by examiner

Primary Examiner — Keith Fang

(57) ABSTRACT

A controller monitors resource usage in each of a plurality of sectors and identifies any sector with resource usage that exceeds a threshold value as a high usage sector. The controller evaluates the mobile stations in its area and identifies any mobile station that is using a high usage sector and at least two other sectors for a communication session as a candidate mobile station. The controller applies a predictive algorithm to determine whether any candidate mobile station is able to continue its respective communication session without using its respective high usage sector. In this determination, the signal levels that a mobile station reported for the sectors in its active set, other than the high usage sector, may be used to calculate a combined signal level. If the combined signal level exceeds a predefined value, the mobile station is instructed to drop the high usage sector.

20 Claims, 3 Drawing Sheets

METHOD AND SYSTEM FOR BALANCING SOFT HANDOFF GAIN AND RESOURCE USAGE

BACKGROUND

For certain types of wireless communication, such as wireless communication that uses code division multiple access (CDMA), a mobile station may able to use more than wireless link for a communication session. Even though each wireless link may convey the same information, the signal diversity from using multiple wireless links may be used to achieve a signal gain that is often described as "soft handoff gain." Thus, the mobile station may be able to combine the forward link signals from the multiple wireless links to achieve a higher signal-to-noise ratio (SNR) for the forward link, and the network may be able to combine the reverse link signals from the multiple wireless links to achieve a higher SNR for the reverse link.

OVERVIEW

In a first principal aspect, an exemplary embodiment provides a method for adjusting resource usage by a mobile station in communication with a wireless network. In accordance with the method, the wireless network communicates with the mobile station during a communication session via a plurality of sectors. The plurality of sectors defines an initial active set. At some point, it is determined that the initial active set includes at least one high usage sector. A reduced active set of one or more sectors is then defined as the initial active set exclusive of the at least one high usage sector. A reduced-set signal level is calculated by combining signal levels measured at the mobile station of signals from the one or more sectors in the reduced active set. It is determined whether the reduced-set signal level satisfies an acceptability condition. If the reduced-set signal level satisfies the acceptability condition, the communication session is continued using the reduced active set instead of the initial active set.

In a second principal aspect, an exemplary embodiment provides a method for adjusting resource usage in a plurality of sectors of a wireless network. In accordance with the method, resource usage in each of the plurality of sectors is monitored. At some point, it is determined that resource usage in a given sector in the plurality of sectors exceeds a threshold value. Any mobile station that is using the given sector and at least two other sectors for a communication session is then identified as a candidate mobile station. A predictive algorithm is applied to determine whether any candidate mobile station is able to continue its respective communication session without using the given sector. Any candidate mobile station determined able to continue its respective communication session without using the given sector is instructed to drop the given sector.

In a third principal aspect, an exemplary embodiment provides a system comprising a plurality of transmitter defining a plurality of sectors for transmitting forward link signals to mobile stations and a controller for controlling resource usage in the plurality of sectors. The controller is configured to: (a) monitor resource usage in each of the plurality of sectors; (b) identify any sector in the plurality of sectors with resource usage that exceeds a threshold value as a high usage sector; (c) identify any mobile station that is using a high usage sector and at least two other sectors for a communication session as a candidate mobile station; (d) apply a predictive algorithm to determine whether any candidate mobile station is able to continue its respective communication session without using its respective high usage sector; and (e) cause any candidate mobile station determined able to continue its respective communication session without using its respective high usage sector to drop its respective high usage sector.

DETAILED DESCRIPTION OF EXEMPLARY EMBODIMENTS

1. Introduction

Figure 1:
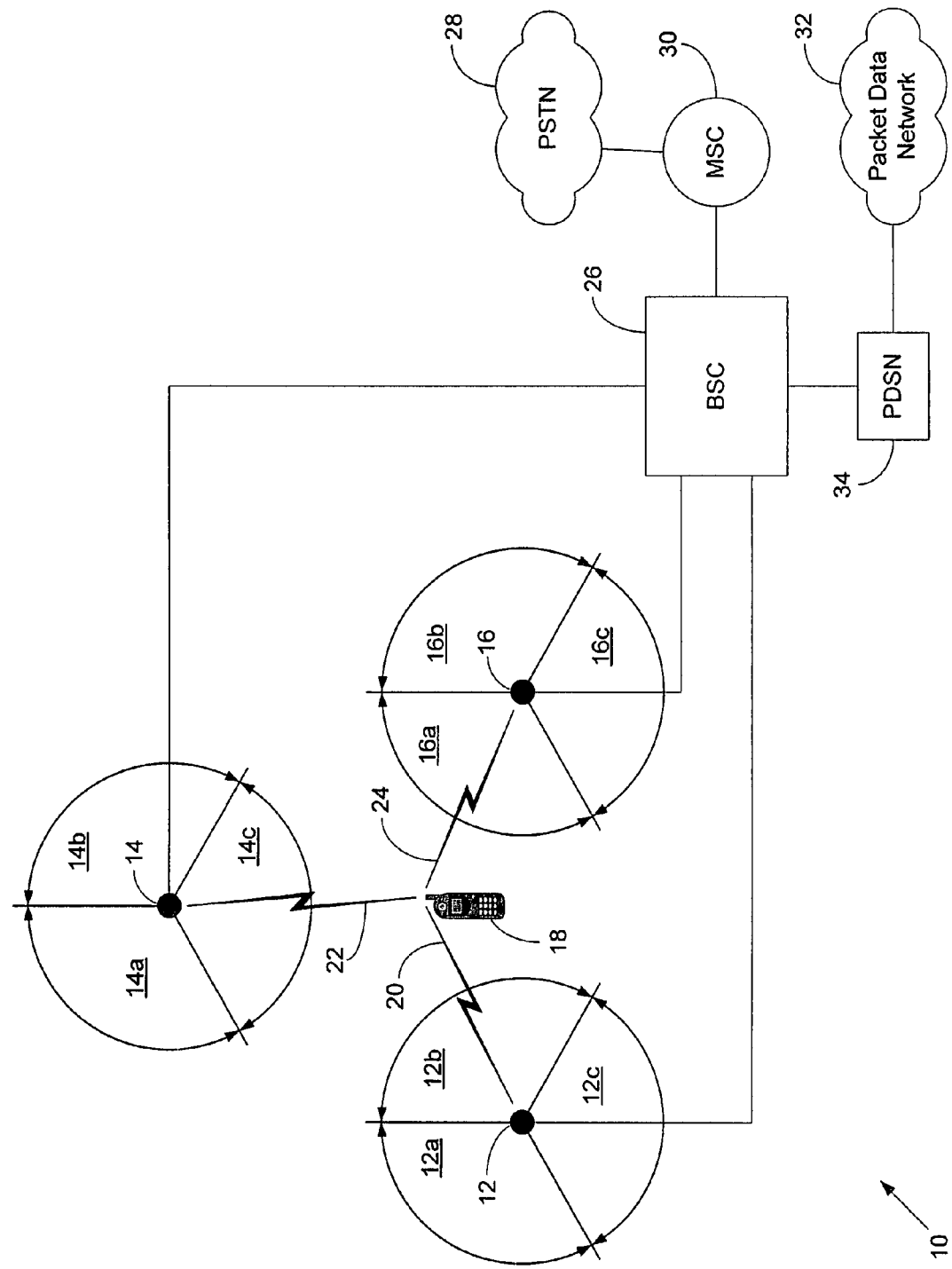
FIG. 1 is a block diagram of a wireless telecommunications network, in accordance with an exemplary embodiment.

While the use multiple sectors for a mobile station's communication session can beneficially provide soft handoff gain, the inventors have recognized that the benefits come at a price: an increased risk of dropped calls, blocked calls, and other resource-based service impairments caused by the increased usage of communication resources.

To better balance the advantages and disadvantages of using multiple sectors for a mobile station's communication session, the inventors propose systems and methods for monitoring the resource usage of each sector in a given area (e.g., the area served by a base station controller). When resource usage in a sector exceeds a threshold value, the sector may be identified as a high usage sector. For those mobile stations that use the high usage sector to achieve soft handoff gain for a communication session, a predictive algorithm may be applied to determine whether any of the mobile stations is able to continue its respective communication session without using the high usage sector. Then, any mobile station found able to continue its communication session without using the high usage sector may be instructed to drop the high usage sector.

The predictive algorithm may evaluate the signal levels that a mobile station reported for the sectors in its active set. For example, if a combined signal level for the sectors in the mobile station's active set, exclusive of the high usage sector, is found to satisfy an acceptability condition, then the mobile station may be instructed to drop the high usage sector. The acceptability condition could be selected as a minimum combined signal level or other condition that may be deemed a sufficient indicator of an ability to maintain the mobile station's communication session at an acceptable quality of service level.

Monitoring the resource usage of a sector may involve an evaluation of the sector's usage of forward link resources that have been allocated to the sector. For example, a sector may have a hardware allocation (e.g., a maximum number of transmitters that the sector can use to transmit forward link signals), a forward traffic channel allocation (e.g., a maximum number of forward traffic channels that the sector can use for forward link signals), a Walsh code allocation (e.g., a maximum number of Walsh codes that the sector can use for forward link signals), and/or a forward link power allocation (e.g., a maximum total power that the sector can use to transmit forward link signals). If the sector is using more than a threshold percentage of any of these allocations to transmit forward link signals, then the sector may be identified as a high usage sector. A sector may also have a certain number of resources allocated to it for receiving reverse link signals. Thus, monitoring the resource usage of a sector may also involve an evaluation of the sector's usage of reverse link resources.

By identifying high usage sectors and instructing mobile stations to drop any high usage sectors that are deemed unnecessary to maintain the mobile stations' communication sessions, communication resources can be used more efficiently while still realizing the benefits of soft handoff gain.

2. Exemplary Network Architecture

FIG. 1 illustrates an exemplary wireless telecommunications network 10 in which exemplary embodiments may be employed. Network 10 includes a plurality of base transceiver stations (BTSs), exemplified in FIG. 1 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device. For purposes of illustration, network 10 will be described herein as using code division multiple access (CDMA) based wireless communication, such as 1xRTT or EV-DO. It is to be understood, however, that other types of wireless communication may be used.

Each BTS may include a plurality of transmitters and a plurality of receivers (the transmitters and receivers may be in a plurality of transceivers) for wireless communication with mobile stations. Moreover, each BTS may include directional antennas to define a plurality of sectors. For example, BTS 12 may have sectors 12a, 12b, and 12c, BTS 14 may have sectors 14a, 14b, and 14c, and BTS 16 may have sectors 16a, 16b, and 16c. Although FIG. 1 shows each BTS with three sectors, it is to be understood that a BTS may have a greater or fewer number of sectors. Moreover, it is to be understood that the illustration of sectors in FIG. 1 is schematic only and that FIG. 1 is not intended to illustrate the precise geographic area covered by any sector.

In the CDMA case, each sector may be identified by a distinct pseudonoise (PN) code offset. Each sector may have available to it a number of forward channels for transmitting forward link signals, with each of the forward channels being identified by a distinct Walsh code. The forward channels may include a plurality of control channels, such as a pilot channel, a sync channel, and one or more paging channels. The forward channels may also include a plurality of forward traffic channels. Each sector may also be able to receive up to a certain number of reverse link channels, which may include access channels and reverse traffic channels.

A mobile station may use more than one sector for wireless communication. For example, FIG. 1 shows mobile station 18 with three wireless communication links: link 20 with BTS 12 via sector 12b, link 22 with BTS 14 via sector 14c, and link 24 with BTS 16 via sector 16a. Each wireless communication link may include a respective forward link that carries wireless communications from the BTS to the mobile station and a respective reverse link that carries wireless communications from the mobile station to the BTS. Thus, BTS 12 may use a transmitter associated with sector 12b for transmitting forward link signals in wireless communication link 20 via sector 12b and may use a receiver associated with sector 12b for receiving reverse link signals in wireless communication link 20 via sector 12b. BTSs 14 and 16 may similarly use transmitters and receivers for transmitting forward link signals and receiving reverse link signals in wireless communication links 22 and 24, respectively, via sectors 14c and 16a.

Although FIG. 1 shows mobile station 18 using three wireless communication links, it is to be understood that a mobile station may use a greater or fewer number of wireless communication links. In addition, although FIG. 1 shows wireless communications links 20, 22, and 24, with different BTSs, it is to be understood that a mobile station may have more than one wireless communication link with the same BTS (e.g., using different sectors of the BTS). In some cases, a mobile station may have more than one wireless communication link with the same sector.

The wireless communication links used by mobile station 18 may also change, for example, when mobile station 18 moves from one physical location to another. The change may involve adding or dropping wireless communication links and/or replacing one wireless communication link for another. For example, mobile station 18 might move in a direction that causes wireless communication link 20 to be replaced by a new wireless communication link with BTS 12 via sector 12c. A handoff process may be used to change the wireless communication links used by mobile station 18.

BTSs 12, 14, and 16 may be controlled by a base station controller (BSC) 26. BSC 26 may control the use of forward and reverse traffic channels for wireless communication between BTSs 12, 14, and 16 and mobile stations, such as mobile station 18. As described in more detail below, BSC 26 may also monitor the resource usage of BTSs 12, 14, and 16, identifying any high usage sectors. In addition, BSC 26 may apply a predictive algorithm to determine which mobile stations are able to continue communication sessions without using high usage sectors. When BSC 26 determines that a high usage sectors may be dropped from a mobile station's communication session, BSC 26 may instruct the mobile stations to drop the high usage sectors, for example, by causing a handoff directive to be transmitted to the mobile station. Although FIG. 1 shows three BTSs (BTS 12, 14, and 16) and nine sectors (sectors 12a-c, 14a-c, and 16a-c) in the service area of BSC 26, it is to be understood that a BSC could have a greater or fewer number of BTSs and/or sectors in its service area.

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

A mobile station may use a plurality of wireless links for such communication sessions, for example, in order to achieve soft handover gain. Thus, mobile station 18 may use wireless communication links 20, 22, and 24 for a communication session with an endpoint via PSTN 28 or via packet data network 32. Mobile station 18 may combine the forward link signals received via wireless communication links 20, 22, and 24 in order to achieve soft handoff gain on the forward link. In addition, BSC 26 may combine the reverse link signals received via wireless communication links 20, 22, and 24 in order to achieve soft handoff gain on the reverse link.

The set of one or more sectors that a mobile station uses for a communication session may be defined as the mobile station's "active set." Thus, with the configuration of wireless communication links 20, 22, and 24 shown in FIG. 1, sectors 12b, 14c, and 16a may make up the active set of mobile station 18. A mobile station may periodically measure the signal levels it receives from each of the sectors in its active set and report the signal levels to network 10. BSC 26 may use these signal levels reported by mobile stations when evaluating the possibility of having mobile stations drop high usage sectors, as described in more detail below.

3. Exemplary Operation

Figure 2:
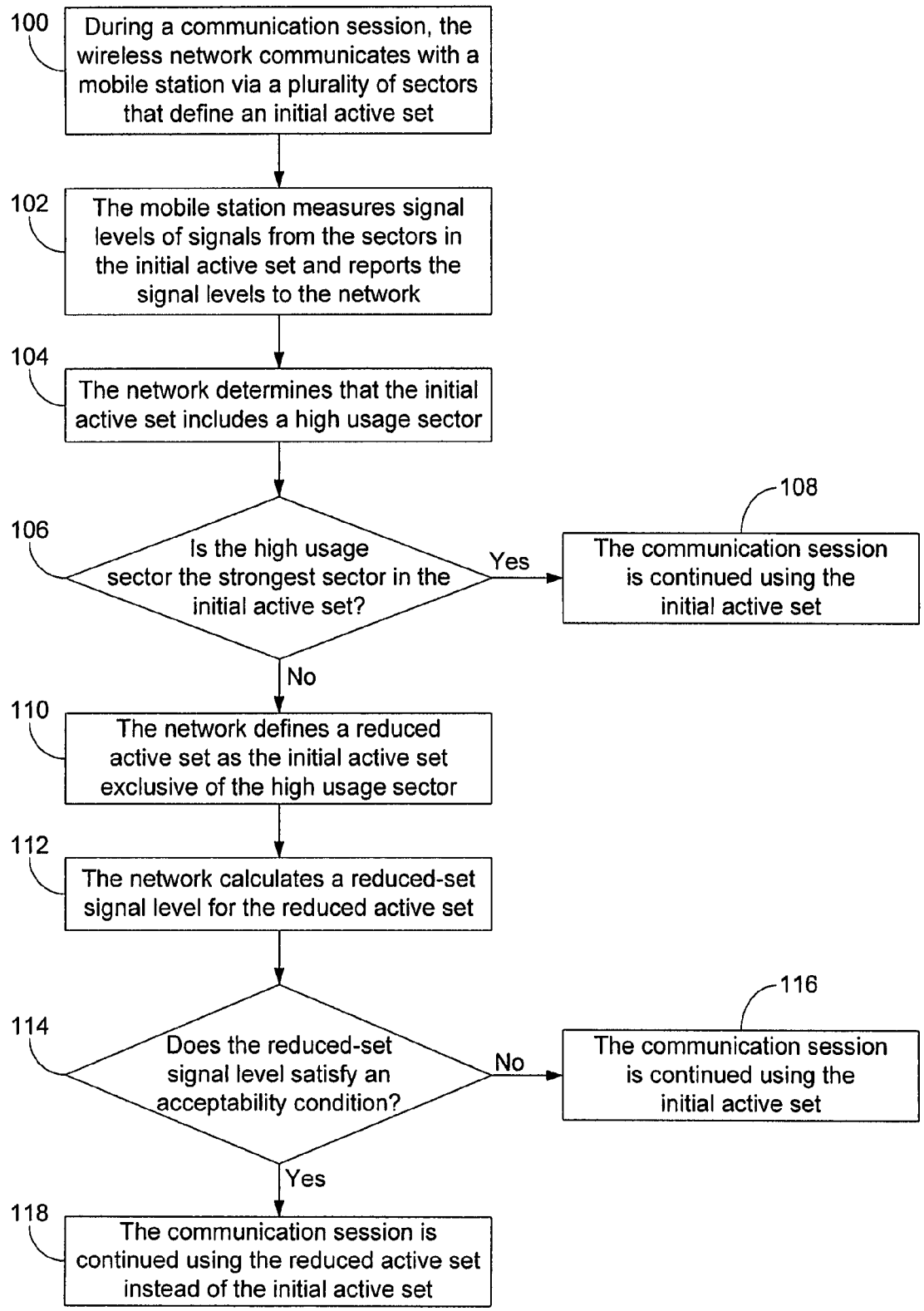
FIG. 2 is a flow chart illustrating a method for determine whether a mobile station should continue a communication session without using a high usage sector, in accordance with an exemplary embodiment.

FIG. 2 is a flowchart illustrating an exemplary method of operation. The method may begin with a mobile station (e.g., mobile station 18) engaged in a communication session with a wireless network (e.g., network 10). During the communication session, the wireless network communicates with the mobile station via a plurality of sectors (e.g., sectors 12b, 14c, and 16a) that define an initial active set for the mobile station, as indicated by block 100.

The mobile station measures signal levels of signals (e.g., pilot signals) from the sectors in the initial active set and reports the signal levels to the network, as indicated by block 102. The mobile station may report the signal levels, for example, by transmitting a Pilot Strength Measurement Message (PSMM). In an exemplary embodiment, the signal levels are measured as $E_C/I_0$ values, wherein $E_C$ is the energy per chip and $I_0$ is the interference power density. It is to be understood, however, that the signal levels could be measured and/or reported in terms of parameters other than $E_C$ and $I_0$.

As noted above, the network may be continually monitoring the resource usage of each sector, including each sector in the mobile station's initial active set, and may identify one or more sectors as being high usage sectors. In the example illustrated in FIG. 2, the network determines that the initial active set includes a high usage sector, as indicated by block 104. In response to this determination, the network may evaluate the mobile station's initial active set to predict whether the mobile station is able to continue the communication session without using the high usage sector, i.e., whether the high usage sector should be dropped.

As an initial step of this evaluation, the network may check the signal levels that the mobile station reported in block 102 to determine whether the high usage sector is the strongest sector in the mobile station's initial active set, as indicated by block 106. If the high usage sector is the strongest sector in the mobile station's initial active set, then the communication session is continued using all of the sectors in the initial active set, as indicated by block 108.

On the other hand, if the high usage sector is not the strongest sector in the mobile station's initial active set, the network may define a reduced active set as the initial active set exclusive of the high usage sector, as indicated by block 110. The network may then calculate a reduced-set signal level for the reduced active set, as indicated by block 112. The reduced-set signal level may be calculated by combining (e.g., summing) the $E_C/I_0$ values the mobile station reported for each of the sectors in the initial active set, other than the high usage sector. Thus, the reduced-set signal level may be used to estimate the combined signal level that can be achieved at the mobile station for the communication session using just the sectors in the reduced active set, i.e., without using the high usage sector.

The network may then determine whether the reduced-set signal level satisfies an acceptability condition, as indicated by block 114. The acceptability condition may be used to predict whether the communication session can be maintained at an acceptable quality of service level using only the sectors in the reduced active set, i.e., without using the high usage sector. If the acceptability condition is not satisfied, then the communication session is continued using the initial active set, as indicated by block 116. If the acceptability condition is satisfied, then the communication is continued using the reduced active set instead of the initial active set (i.e., the high usage sector is dropped), as indicated by block 118.

The network may make the block 114 determination in various ways. In one approach, the network may compare the reduced-set signal level to a predefined value. If the reduced-set signal level is greater than the predefined value, then the acceptability condition is satisfied. In this approach, the predefined value may be chosen as the minimum signal level that can still reliably support the communication session.

In an alternative approach, the reduced-set signal level may be compared to an initial-set signal level for the initial active set. The initial-set signal level could be calculated by combining (e.g., summing) the $E_C/I_0$ values that the mobile station reported for all of the sectors in the initial active set, including the high usage sector. If the difference between the reduced-set signal level and the initial-set signal level is sufficiently small (e.g., less than a predefined value or less than a predefined faction of the initial-set signal level), then the acceptability condition is satisfied.

Figure 3:
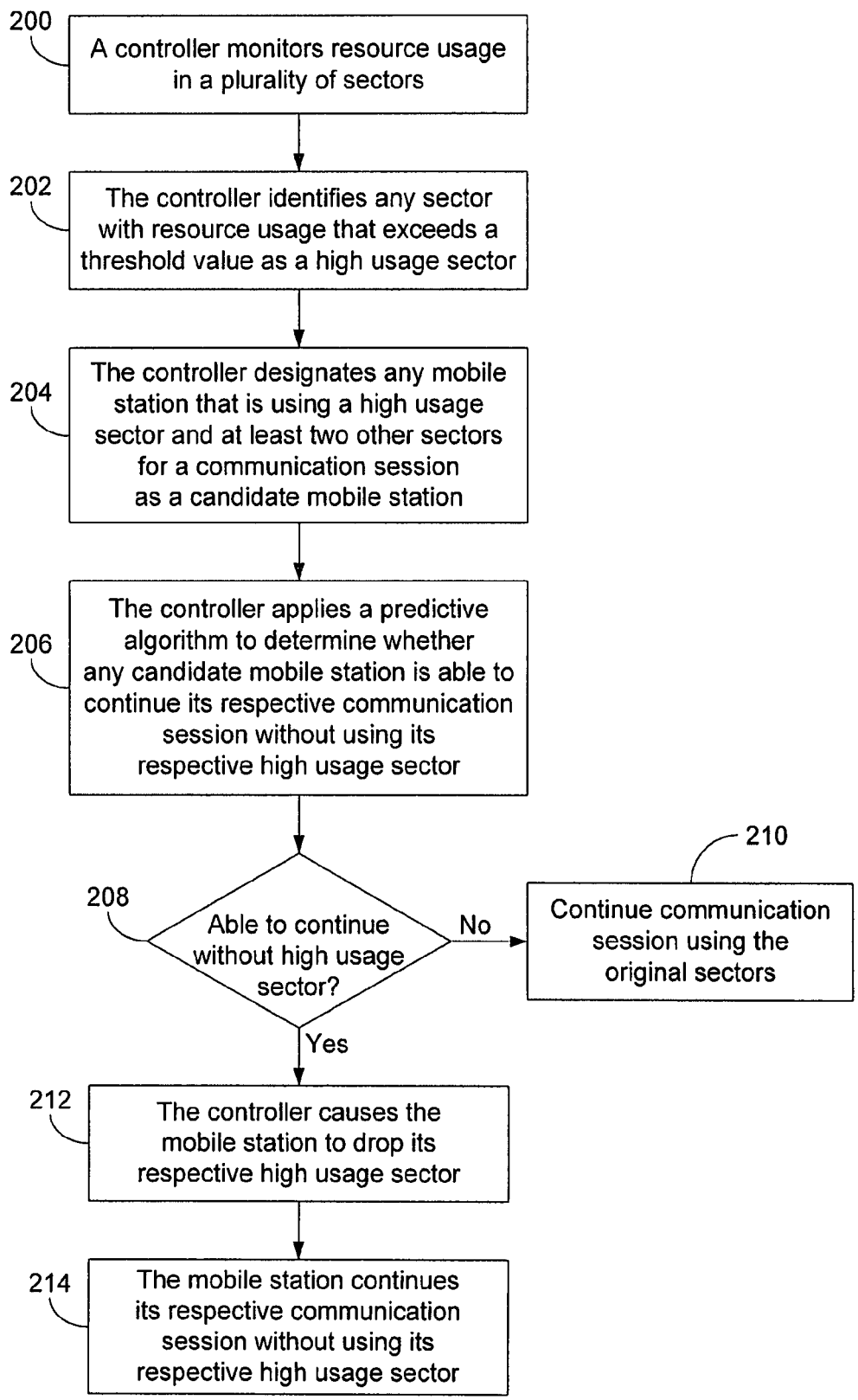
FIG. 3 is a flow chart illustrating a method for determining whether mobile stations should drop high usage sectors, in accordance with an exemplary embodiment.

Whereas FIG. 2 illustrates an exemplary method for evaluating a particular mobile station for the case that the network has determined that the mobile station's initial active set includes a high usage sector, FIG. 3 is a flow chart illustrating an exemplary method for evaluating multiple mobile stations.

The method for evaluation multiple mobile stations may begin with a controller (e.g., BSC 26) monitoring resource usage in a plurality of sectors, as indicated by block 200. The resource usage that the controller monitors for each sector may include the sector's usage of: (i) an allocation of hardware resources (e.g., each sector may have a maximum number of transmitters that the sector can use to transmit forward link signals), (ii) an allocation of air interface resources (e.g., each sector may have a maximum number of Walsh codes or forward traffic channels that the sector can use to transmit forward link signals), and/or (iii) a power allocation (e.g., a maximum total power that the sector can use to transmit forward link signals, including forward link signals in control and traffic channels). The controller then identifies any sector with resource usage that exceeds a threshold value as a high usage sector, as indicated by block 202. The threshold value may correspond to a threshold percentage (e.g., 95%) of any of the sector's resource allocations. Thus, a sector that uses more than a threshold percentage (e.g., more than 95%) of any resource allocation (e.g., hardware allocation, Walsh code allocation, forward traffic channel allocation, or power allocation) may be identified as a high usage sector.

Once the controller has identified one or more high usage sectors, the controller may designate any mobile station that is using a high usage sector and at least two other sectors for a communication session as a candidate mobile station, as indicated by block 204. The controller may identify such candidate mobile stations by reviewing the signal strength measurements that the mobile stations most recently reported for their respective active sets. As discussed above for FIG. 2, the signal strength measurements for active set sectors may be contained in Pilot Strength Measurement Messages (PSMMs) that the mobile stations periodically transmit to the network.

The controller may then apply a predictive algorithm to determine whether any candidate mobile station is able to continue its respective communication session without using its respective high usage sector, as indicated by block 206. The predictive algorithm may make this determination for each mobile station by evaluating the signal levels from the sectors in the mobile station's active set, as discussed above for FIG. 2.

How the method proceeds for each mobile station depends on whether the mobile station is deemed able to continue its respective communication session without its respective high usage sector (based on the predictive algorithm), as indicated by block 208. If it is determined that a mobile station is likely to need its respective high usage sector in order to maintain its respective communication session, then the communication session may be continued using the original sectors, as indicated by block 210.

On the hand, if it is determined that a mobile station is likely to be able to continue its respective communication session without using its respective high usage sector, then the controller may cause the mobile station to drop the high usage sector, as indicated by block 212. The controller may do this, for example, by causing a Handoff Direction Message (HDM) to be transmitted to the mobile station. In response, the mobile station drops the high usage sector and continues its respective communication session without using its respective high usage sector, as indicated by block 214.

It is to be understood that the predictive algorithm may be configured to make predictions based on statistical models and/or policies regarding how best to balance the advantages of soft handoff gain with the disadvantages of increased resource usage. Thus, when a predictive algorithm determines that a mobile station is or is not able to continue a communication session without using a high usage sector, the determination may be one of statistical likelihood rather than certainty. Thus, the criteria used by the predictive algorithm may be set so as to provide determinations at a statistical confidence level (e.g., at the 95% confidence level) based on the available information.

In this way, the use of multiple sectors to achieve soft handoff gain for a communication session may be more carefully controlled so as not to be overused. Accordingly, the benefits of soft handoff gain can be balanced against the drawbacks of using multiple sectors and, thus, more communication resources, to achieve the soft handoff gain.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for adjusting resource usage by a mobile station in communication with a wireless network, said method comprising:
during a communication session, said wireless network communicating with said mobile station via a plurality of sectors, said plurality of sectors defining an initial active set;
determining that said initial active set includes at least one high usage sector;
defining a reduced active set of sectors as said initial active set exclusive of said at least one high usage sector;
calculating a reduced-set signal level by combining signal levels measured at said mobile station of signals from said sectors in said reduced active set;
determining whether said reduced-set signal level satisfies an acceptability condition; and
if said reduced-set signal level satisfies said acceptability condition, continuing said communication session using said reduced active set instead of said initial active set.

2. The method of claim 1, wherein each sector in said plurality of sectors is associated with a respective forward link for conveying communications from said wireless network to said mobile station and a respective reverse link for conveying communications from said mobile station to said wireless network.

3. The method of claim 2, wherein determining that said initial active set includes at least one high usage sector comprises:
for each given sector in said initial active set, evaluating usage of one or more forward link resources of said given sector.

4. The method of claim 3, wherein evaluating usage of one or more forward link resources of said given sector comprises:
evaluating usage of a hardware allocation of said given sector, wherein said given sector is identified as being a high usage sector when said given sector uses more than a threshold percentage of said hardware allocation to transmit forward link signals.

5. The method of claim 3, wherein evaluating usage of one or more forward link resources of said given sector comprises:
evaluating usage of a forward traffic channel allocation of said given sector, wherein said given sector is identified as being a high usage sector when said given sector uses more than a threshold percentage of said forward traffic channel allocation to transmit forward link signals.

6. The method of claim 3, wherein evaluating usage of one or more forward link resources of said given sector comprises:
evaluating usage of a Walsh code allocation of said given sector, wherein said given sector is identified as being a high usage sector when said given sector uses more than a threshold percentage of said Walsh code allocation to transmit forward link signals.

7. The method of claim 3, wherein evaluating usage of one or more forward link resources of said given sector comprises:
evaluating usage of a forward link power allocation of said given sector, wherein said given sector is identified as being a high usage sector when said given sector uses more than a threshold percentage of said forward link power allocation to transmit forward link signals.

8. The method of claim 1, wherein determining whether said reduced-set signal level satisfies an acceptability condition comprises:
comparing said reduced-set signal level to a predefined value, wherein said reduced-set signal level satisfies said acceptability condition when said reduced-set signal level is greater than said predefined value.

9. The method of claim 1, wherein determining whether said reduced-set signal level satisfies an acceptability condition comprises:
calculating an initial-set signal level by combining signal levels measured at said mobile station of signals from said plurality of sectors in said initial active set;

calculating a difference between said initial-set signal level and said reduced-set signal level; and comparing said difference to a predefined value, wherein said reduced-set signal level satisfies said acceptability condition when said difference is less than said predefined value.

10. A method for adjusting resource usage in a plurality of sectors of a wireless network, said method comprising:

the wireless network monitoring resource usage in each of said plurality of sectors;

the wireless network determining that resource usage in a given sector in said plurality of sectors exceeds a threshold value;

the wireless network identifying any mobile station that is using said given sector and at least two other sectors for a communication session as a candidate mobile station;

the wireless network applying a predictive algorithm to determine whether any candidate mobile station is able to continue its respective communication session without using said given sector; and the wireless network instructing any candidate mobile station determined able to continue its respective communication session without using said given sector to drop said given sector.

11. The method of claim 10, wherein determining that resource usage in a given sector in said plurality of sectors exceeds a threshold value comprises:

evaluating usage of a hardware allocation of said given sector; and determining that said given sector is using more than a threshold percentage of said hardware allocation to transmit forward link signals.

12. The method of claim 10, wherein determining that resource usage in a given sector in said plurality of sectors exceeds a threshold value comprises:

evaluating usage of a forward traffic channel allocation of said given sector; and determining that said given sector is using more than a threshold percentage of said forward traffic channel allocation to transmit forward link signals.

13. The method of claim 10, wherein determining that resource usage in a given sector in said plurality of sectors exceeds a threshold value comprises:

evaluating usage of a Walsh code allocation of said given sector; and determining that said given sector is using more than a threshold percentage of said Walsh code allocation to transmit forward link signals.

14. The method of claim 10, wherein determining that resource usage in a given sector in said plurality of sectors exceeds a threshold value comprises:

evaluating usage of a forward link power allocation of said given sector; and determining that said given sector is using more than a threshold percentage of said forward link power allocation to transmit forward link signals.

15. The method of claim 10, wherein applying a predictive algorithm to determine whether any candidate mobile station is able to continue its respective communication session without using said given sector comprises:

calculating a combined signal level for a candidate mobile station by combining signal levels at said candidate mobile station of signals from each sector used for said candidate mobile station's respective communication session, other than said given sector;

comparing said combined signal level to a predefined value; and determining that said candidate mobile station is able to continue its respective communication session without said given sector when said combined signal level exceeds said predefined value.

16. A system comprising:

a plurality of transmitters defining a plurality of sectors for transmitting forward link signals to mobile stations; and a controller for controlling resource usage in said plurality of sectors, wherein said controller is configured to:

(a) monitor resource usage in each of said plurality of sectors;

(b) identify any sector in said plurality of sectors with resource usage that exceeds a threshold value as a high usage sector;

(c) identify any mobile station that is using a high usage sector and at least two other sectors for a communication session as a candidate mobile station;

(d) apply a predictive algorithm to determine whether any candidate mobile station is able to continue its respective communication session without using its respective high usage sector; and (e) cause any candidate mobile station determined able to continue its respective communication session without using its respective high usage sector to drop its respective high usage sector.

17. The system of claim 16, wherein said controller is configured to apply said predictive algorithm by performing a process comprising:

calculating a combined signal level for a given candidate mobile station by combining signal levels reported by said given candidate mobile station of signals from each sector used for its respective communication session, other than its respective high usage sector;

comparing said combined signal level to a predefined value; and determining that said given candidate mobile station would be able to continue its respective communication session without using said its respective high usage sector when said combined signal level exceeds said predefined value.

18. The system of claim 16, wherein said controller is configured to cause any candidate mobile station determined able to continue its respective communication session without using its respective high usage sector to drop its respective high usage sector by a process comprising:

transmitting a handoff instruction to said any candidate mobile station.

19. The system of claim 16, wherein said controller is a base station controller (BSC) and said plurality of transmitters are in a plurality of base transceiver stations (BTSs) controlled by said BSC.

20. The system of claim 16, wherein said forward link signals are spread-spectrum signals.

* * * * *